US008011010B2

(12) United States Patent
Michael et al.

(10) Patent No.: US 8,011,010 B2
(45) Date of Patent: Aug. 30, 2011

(54) USING ANTIMALWARE TECHNOLOGIES TO PERFORM OFFLINE SCANNING OF VIRTUAL MACHINE IMAGES

(75) Inventors: Michael L. Michael, Houston, TX (US); William L. Scheidel, Seattle, WA (US); Robert M. Fries, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 712 days.

(21) Appl. No.: 11/736,520

(22) Filed: Apr. 17, 2007

(65) Prior Publication Data

US 2008/0263658 A1  Oct. 23, 2008

(51) Int. Cl.
*G06F 12/14* (2006.01)
*G08B 23/00* (2006.01)
(52) U.S. Cl. .......................................... 726/24; 726/22
(58) Field of Classification Search ............... 726/22, 726/24
See application file for complete search history.

(56) References Cited

U.S. PATENT DOCUMENTS

| 6,067,410 A | 5/2000 | Nachenberg ............... 703/28 |
| 7,093,239 B1 | 8/2006 | Van der Made ............ 717/135 |
| 2005/0138159 A1 | 6/2005 | Challener et al. .......... 709/223 |
| 2005/0172305 A1 | 8/2005 | Baumberger ............... 719/327 |
| 2006/0031673 A1 | 2/2006 | Beck et al. ................. 713/164 |
| 2006/0136720 A1* | 6/2006 | Armstrong et al. ......... 713/164 |
| 2006/0155735 A1* | 7/2006 | Traut et al. ................. 707/101 |
| 2006/0155931 A1 | 7/2006 | Birrell et al. ............... 711/115 |
| 2006/0218544 A1 | 9/2006 | Chakraborty et al. ....... 717/168 |
| 2006/0225065 A1 | 10/2006 | Chandhok et al. .......... 717/168 |
| 2006/0253706 A1 | 11/2006 | Roberts et al. ............. 713/168 |
| 2007/0005919 A1 | 1/2007 | Van Riel .................... 711/163 |
| 2007/0234337 A1* | 10/2007 | Suzuki et al. ............... 717/168 |
| 2007/0256075 A1* | 11/2007 | Denis ......................... 718/102 |
| 2008/0104591 A1* | 5/2008 | McCrory et al. ............ 718/1 |

OTHER PUBLICATIONS

Garfinkel, T. et al., "When Virtual is Harder than Real: Security Challenges in Virtual Machine Based Computing Environments," *HotOS X Paper*, 2005, http://www.usenix.org/events/hotos05/prelim_papers/farfinkel/garfinkel_html, 13 pages.

Garfinkel, T. et al., "Terra: A Virtual Machine-Based Platform for Trusted Computing," *SOSP*, 2003, 193-206.

King et al., "SubVirt: Implementing malware with virtual machines," *IEEE Symposium on Security and Privacy*, 2006, abstract only, 2 pages.

* cited by examiner

*Primary Examiner* — Jason K Gee
(74) *Attorney, Agent, or Firm* — Woodcock Washburn LLP

(57) ABSTRACT

Methods and systems for scanning a virtual machine image. The virtual machine image may be stored as a collection of one or more virtual hard disk files. The virtual machine image may be stored by taking the virtual machine off-line or may be stored by taking a checkpoint of the virtual machine while the virtual machine is on-line. The virtual machine image is rendered to file-system data. Rendering the virtual machine image to file-system data may comprise mounting the virtual machine image's virtual hard disk drives. An anti-malware engine is invoked to scan the exposed file-system data, and data indicative of the scanning may be stored.

19 Claims, 8 Drawing Sheets

USING ANTIMALWARE TECHNOLOGIES TO PERFORM OFFLINE SCANNING OF VIRTUAL MACHINE IMAGES

BACKGROUND

With virtual machines, a host computer may support a number of virtual machines, each representing its own execution environment. Each virtual machine may run an operating system and distinct applications. Because multiple operating environments may run on a single host, a virtual machine architecture provides a great deal of flexibility and scalability to a system administrator or computer system architect and may enhance security and reliability by effectively isolating the virtual machines from one another.

System administrators may bring virtual machines on-line and off-line faster than deploying physical computing devices. Also, virtual machines allow administrators to create, copy, modify, backup and rollback the execution state of the virtual machines faster than with physical computing devices. For example, in a server farm of web servers and e-commerce servers, the server farm may only have a fixed number of physical computing devices deployed. With virtual machines, the administrator may quickly change the ratio of web server to e-commerce servers to match demand by quickly deploying additional virtual machines within the server farm.

Virtual machine technology makes the operation of migrating from one server to another similar to that of copying and moving files. For example, suppose the virtual machine image of the web server faces increased utilization of processing and/or memory resources. If the virtual machine's host is unable to provide more resources, the virtual machine can be easily and quickly migrated to another host that can provide the additional resources needed. Such a process is often referred to as resource balancing or load balancing of virtual machines across hosts. Because this dynamic flexibility provides significant value for the user and administrator, virtual machines have seen a rapid adoption in many computing environments.

In addition, virtual machines allow for users to deploy and rapidly scale large numbers of servers. For example, depending on the hardware resources and the nature of the application, a single physical server may support tens of virtual machines, each supporting different applications. Virtual machines that don't need to be always running can be rapidly deployed or taken off-line to save resources. Along with the benefits of scalability come the challenges of management and security. With a vast number of virtual machines in a network, it becomes difficult to provide adequate protection against malicious software, also known as malware, such as computer viruses, spyware, worms, root kits and the like.

Further compounding the problem, because of the ease with which virtual machines may be brought on-line and off-line, an infestation of malware may become difficult to cure. For example, when a computer worm attacks a conventional network of computers, the worm typically infects multiple computers relatively quickly. Once the administrator identifies which machines are infected and provides the appropriate remedies, such as cleanup patches and procedures, the computers may be safe from being later infected.

However, in a virtual machine environment, virtual machines may be brought into service and brought out of service regularly. This transient topology of virtual machines makes it difficult for administrators to quickly identify and remove infected machines. Accordingly, virtual machines that are infected may be taken out of service, or off-line, before being cleaned or patched. Later, when the virtual machine is brought back into service, an infestation may be reintroduced to the network. As a result, worm and virus infections of networks of virtual machines tend to persist at a low-level indefinitely.

Traditional malware scanning technology provides the ability to scan computers for resident malware. Such software scanners are typically licensed and deployed on a per-computer-basis. Thus, an administrator may be forced to manage at least one malware application per operating environment.

With legacy scanning technology, in a virtual machine environment, the administrator may have to manage at least one malware application per virtual machine. The difficulty of such management may be exacerbated by the large number and transient nature of the virtual machines in the network. Operating an individual malware application per virtual machine may increasingly tax processing and memory resources, especially when more than one virtual machine may be deployed per physical computing device, and may incur costs for additional licensing for each antimalware agent deployed. Additionally, some malware is adept at hiding itself from antimalware programs that are running while the operating system is running.

SUMMARY

A virtual machine image may be stored as a collection of one or more virtual hard disk files (VHDs). The virtual machine image may be stored by taking the virtual machine off-line. Also, a copy of the virtual machine image may be stored by taking a snapshot or a checkpoint of the virtual machine while the virtual machine is on-line. Virtual machine images may be used to create other virtual machines as in, for example, cloning a virtual machine. The virtual machine may be rendered to file-system data comprising the virtual machine's files and system data. Rendering the virtual machine to file-system data may comprise mounting the virtual machine VHDs and exposing them as physical hard disks on the host computer. An anti-malware engine may be engaged to scan the exposed physical hard disks and their file-system data. Scanning the exposed physical hard disks is similar to, and more effective than, scanning the file-system data from within the virtual machine if an anti-malware agent were to be deployed inside the operating system. Data indicative of the scanning may be stored. For example, the data may comprise a scanning timestamp, a scanning result, and a list of infected components.

With more than one set of virtual machine VHDs, each associated with the same virtual machine, such as with a set of checkpoints associated with a virtual machine, one virtual machine image may be associated with a time more recent than others. Upon discovery of malware within a virtual machine image, successively older checkpoints can be scanned iteratively back in time, enabling the discovery of when the virtual machine became infected and allowing appropriate action to be taken with the checkpoint images. Such a process of walking backward through time in a chain of checkpoints or snapshots would identify the last virtual machine image that is safe for operation.

BRIEF DESCRIPTION OF THE DRAWINGS

The foregoing summary, as well as the following detailed description of preferred embodiments, is better understood when read in conjunction with the appended drawings. For the purpose of illustrating the invention, example embodiments are shown in the drawings; however, the invention is not limited to the specific methods and instrumentalities disclosed.

DETAILED DESCRIPTION

The inventive subject matter is described with specificity to meet statutory requirements. However, the description itself is not intended to limit the scope of this patent. Rather, the inventor has contemplated that the claimed subject matter might also be embodied in other ways, to comprise different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Figure 1:
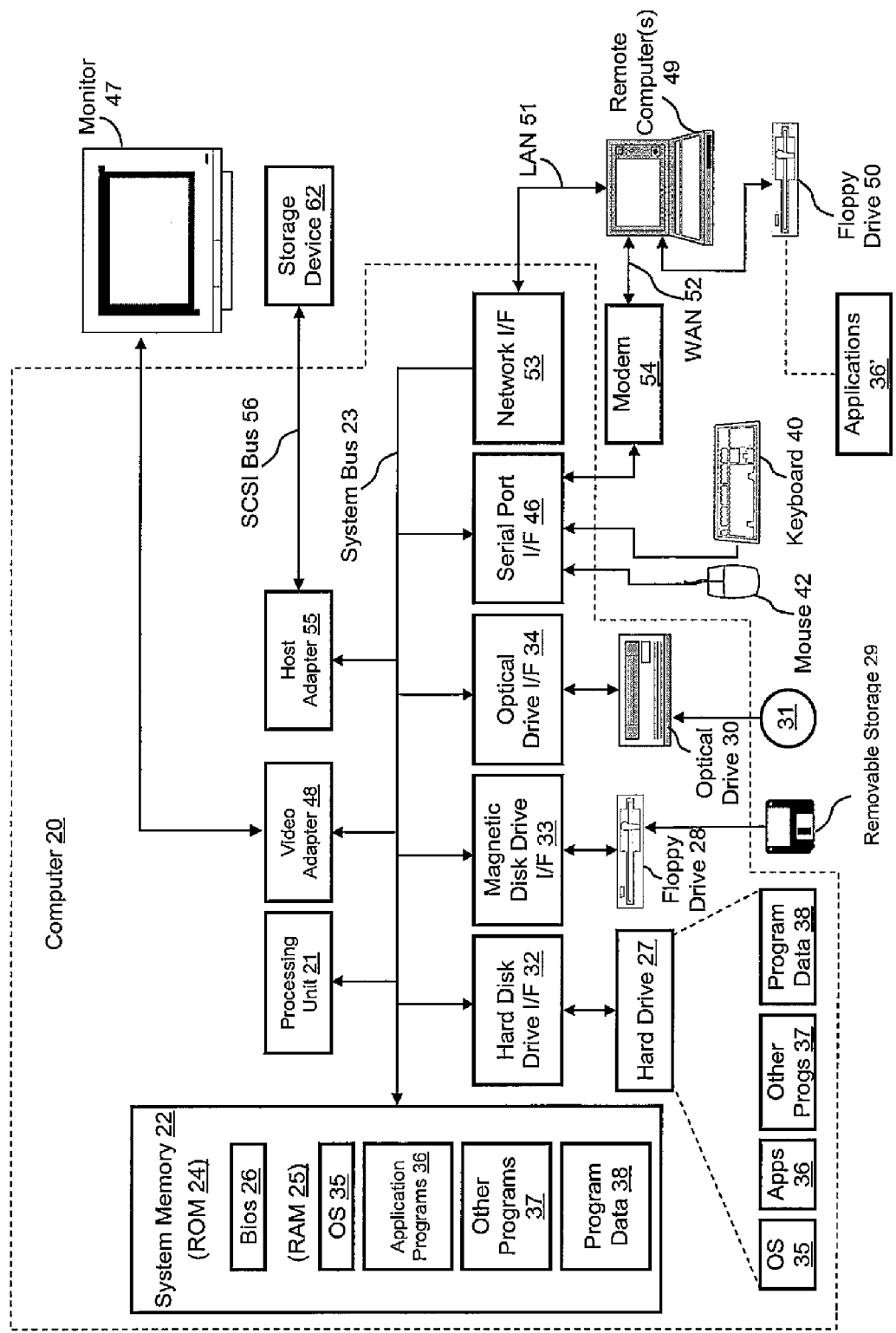
FIG. 1 is a block diagram representing an example operating environment.

Numerous embodiments of the present invention may execute on a computer. FIG. 1 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules comprise routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an example general purpose computing system comprises a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory comprises read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further comprise a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the example environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the example operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may comprise a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically comprise other peripheral output devices (not shown), such as speakers and printers. The example system of FIG. 1 also comprises a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically comprises many or all of the elements described above relative to the personal computer 20, although only a memory storage device 50 has been illustrated in FIG. 1. The logical connections depicted in FIG. 1 comprise a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically comprises a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are example and other means of establishing a communications link between the computers may be used. Moreover, while it is envisioned that numerous embodiments of the present invention are particularly well-suited for computerized systems, nothing in this document is intended to limit the invention to such embodiments.

From a conceptual perspective, computer systems generally comprise one or more layers of software running on a foundational layer of hardware. This layering may be done for reasons of abstraction. By defining the interface for a given layer of software, that layer may be implemented differently by other layers above it. In a well-designed computer system, each layer may rely on the layers adjacent. This allows a layer or a stack of multiple adjoining layers to be replaced without negatively impacting other layers above.

For example, software applications 36 typically rely on lower levels of the operating system 35 to write files to some form of permanent storage, and these applications 36 may not need to understand the difference between writing data to a floppy disk 50, a hard drive 27, or a network folder (not shown). If this lower layer is replaced with new operating system components for writing files, the operation of the upper layer software applications may remain unaffected.

Figure 2A:
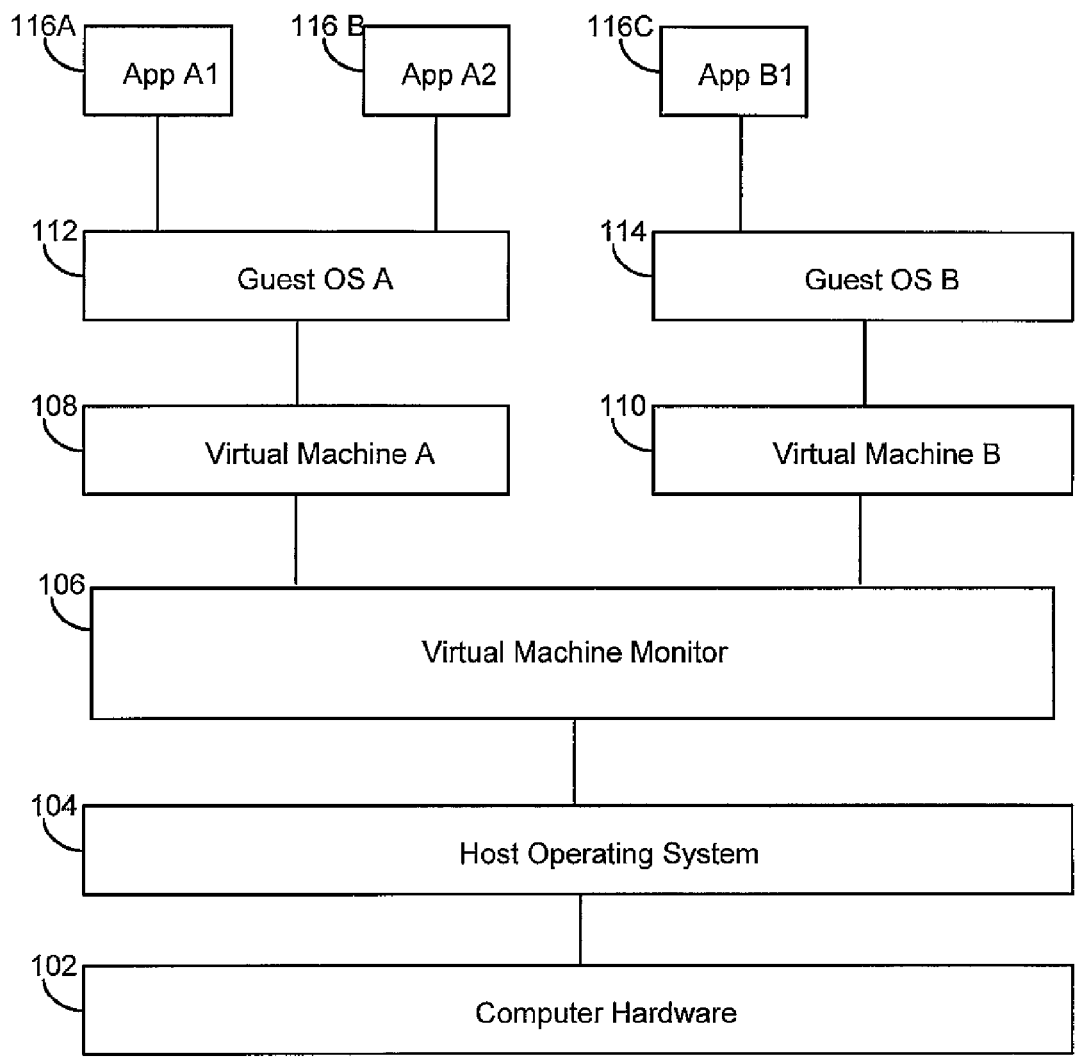
FIGS. 2A and 2B depict example virtualized computing systems.
Figure 2B:
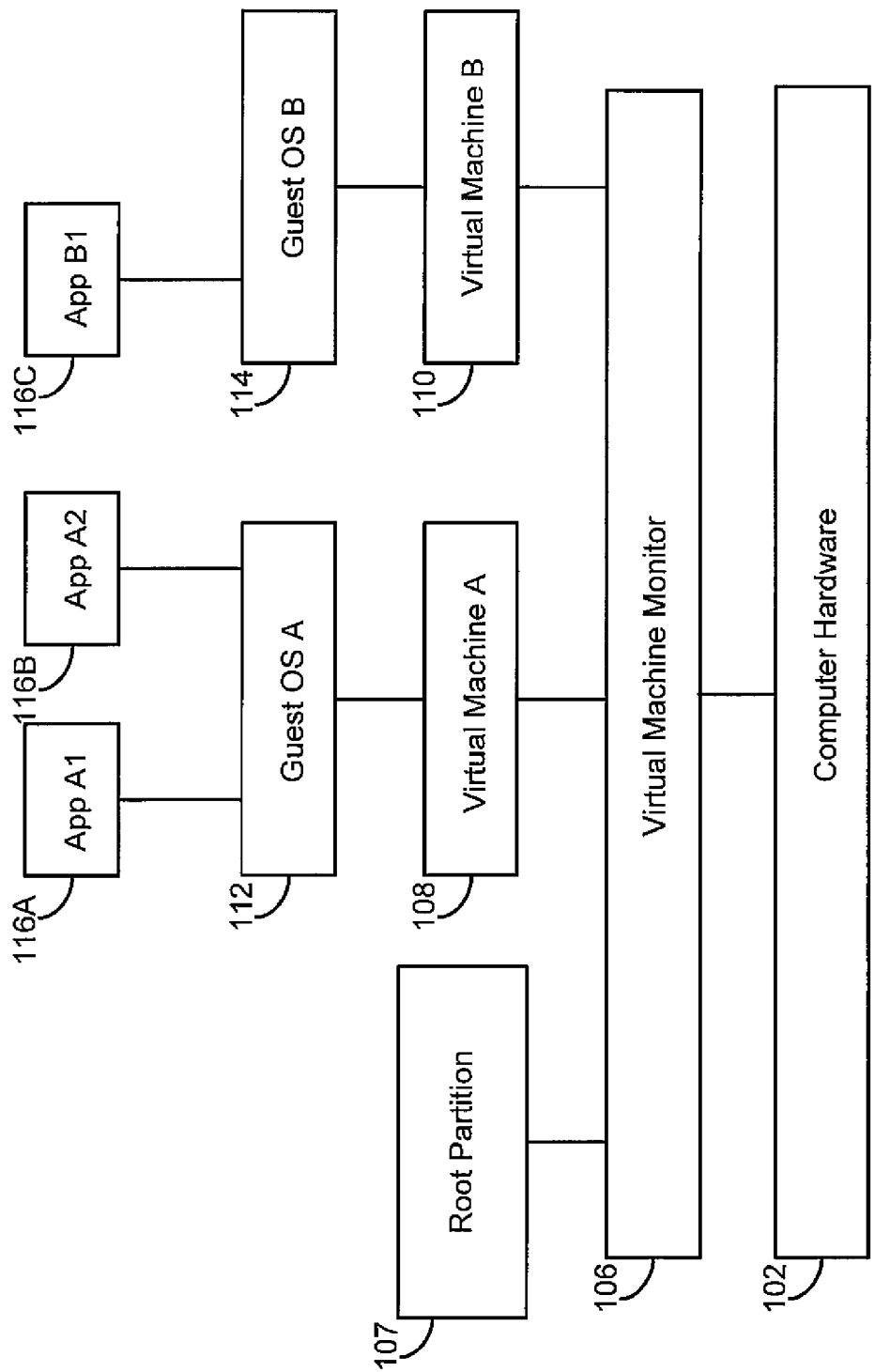

FIGS. 2A and 2B depict example virtualized computing systems. Referring to FIG. 2A, the flexibility of layered software allows a virtual machine 108, 110 to present a virtual hardware layer that may be in fact another software layer. In this way, a virtual machine 108, 110 may create the illusion for the software layers above it that said software layers are running on their own isolated private computer system and physical hardware, and thus virtual machines may allow multiple guest systems 112, 114 and associated applications 116A, B, C to run concurrently on a single host system 104.

A virtualized computing system may comprise a host operating system software layer 104 running directly above physical computer hardware 102. A virtual machine monitor (VMM) 106 may virtualize all the resources of the machine by exposing interfaces that are the same as those of the hardware on which the host operating system 104 is running, enabling the host operating system 104 to go unnoticed by guest operating systems 112, 114 running in the virtual machines 108, 110.

Referring to FIG. 2B, in another embodiment, a virtual machine monitor 106 (VMM) software layer acting as a hypervisor may be running directly on computer hardware 102. A root partition 107 running in a layer on top of the VMM 106 may provide host operating system services to the VMM 106. Virtual machine A 108 and virtual machine B 110 may be virtualized computer hardware representations. Virtual machine A 108 and virtual machine B 110 may present a virtualized environment to Guest OS A 112 and Guest OS B 114 respectively. The virtual machine monitor 106 may perform all of the software steps necessary for Guest OS A 112 and Guest OS B 114 to indirectly interact with the real physical computer hardware 102 while leveraging the host OS facilities from the root partition 107. Guest OS A 112 may provide an operating environment for applications 116A, B. Likewise, Guest OS B 114 may provide an operating environment for applications 116C.

In one embodiment, the virtual machine monitor 106 may comprise part of the host operating system 104. In other embodiments, the virtual machine monitor 106 may be an application running above the host operating system 104 and interacting with the computer hardware 102 through said host operating system 104, for example. In yet other embodiments, the virtual machine monitor 106 may comprise a partially independent software system that may interact indirectly with the computer hardware 102 via the host operating system 104 but may also virtual machine monitor 106 interacts with the computer hardware 102. In another embodiment, the virtual machine monitor 106 may comprise an independent software system that may interact with the computer hardware 102 without utilizing the host operating system 104.

The variations for implementing virtual machines and virtual machine monitors or hypervisors described above are just exemplary implementations, and nothing herein should be interpreted as limiting the disclosure to any particular virtualization aspect.

Figure 3:
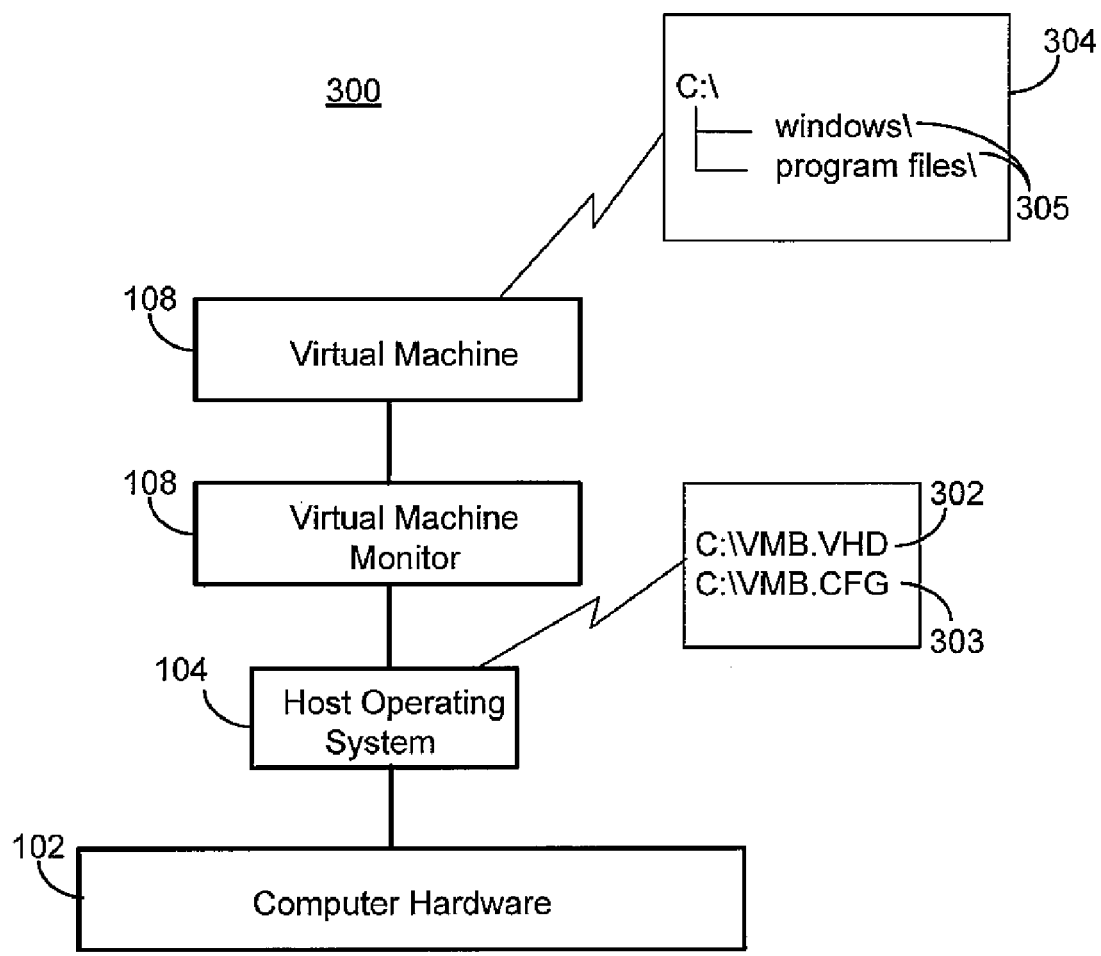
FIG. 3 depicts data in an example virtualized computing system.

FIG. 3 depicts data in an example virtualized computing system. A host computer 300 may comprise computer hardware 102 and a host operating system 104. A virtual machine monitor 106 may virtualize machine resources and facilitate the operation of one or more virtual machines 108. A virtual machine 108 may comprise a virtual machine image 304. The virtual machine image 304 may comprise the data required to operate the virtual machine 108. The virtual machine image 304 may comprise the system files, data files, and related file-system information relating to the virtual machine 108 and the operating system within it. Each virtual machine 108 may be identified by one or more associated virtual machine files.

In one embodiment, the virtual machine image 304 may be represented to the host operating system by one or more virtual hard disk files 302 and a configuration file 303. The virtual hard disk files 302 may in part encapsulate a physical disk device 304. Each virtual hard disk file 302 represents a physical disk of a virtual machine 108 and may contain the system files, data files, and file-system information relating to the virtual machine 108. For example, the virtual hard disk file 302 represents a physical hard disk inside the guest operating system, which might in turn contain one or more volumes, file systems, or the like. For example, the hard disk file 302 may comprise data indicative of the application that is running inside the guest operating system and data indicative of the operating system 104 within which the hard disk file 302 was created, the original and current VHD file size, and data indicative of the disk geometry and type.

To the virtual machine 108, the virtual hard disk file 302 may be represented as a physical disk device 304 that contains a file-system for example. The virtual machine 108 may access individual system files, data files, and other data represented as being stored on this file-system. For example, the virtual machine 108 may access files and directories 305 associated with this disk device 304.

The virtualization provides a level of abstraction such that what appears as a disk and a file-system to the virtual machine 108 appears as a collection of files to the host operating system 104. In one embodiment, the virtual hard disk file 302 may have a .VHD file extension.

The virtual hard disk file 302 may be accompanied by metadata. The metadata may be stored in a metadata file 303. For example, the metadata file 303 may have a .CFG or a .VMC extension. The metadata may comprise information relating to the nature of the virtual hard disk file 302, for example, whether the virtual hard disk file 302 represents a system or boot drive. Metadata related to the virtual machine configuration may also be stored in a file, such as with a .VMC extension.

When the virtual machine 108 is on-line, the virtual machine image 304 may be inaccessible to other processes of the host computer 300. For example, in one embodiment, when the virtual machine 108 is on-line, the associated virtual hard disk files 302 may be locked.

Off-line virtual machines and virtual machine images may be stored in a library file server for extended periods of time and used as templates for new virtual machine deployments, for cloning, or for simply storing the virtual machines until they are needed again. For example, virtual machines could be stored to conserve resources on the virtual machine hosts. Viruses and malware are problems that are haunting IT administrators today, and the VHD files in a library are not immune to such problems. Moreover, since the virtual machines represent separate computing entities, there could be malware and viruses embedded inside the operating system of the virtual machines as well. The threat here is double. In addition, because templates of virtual machines can be used to create new virtual machines, it is imperative that those templates are kept clean from viruses and malware. In some embodiments, stored or off-line virtual machines may be loaded into an operating system entity through VHD mounting and scanned for malware in configured intervals so that the library of offline virtual machines and VHDs is always kept clean.

Figure 4:
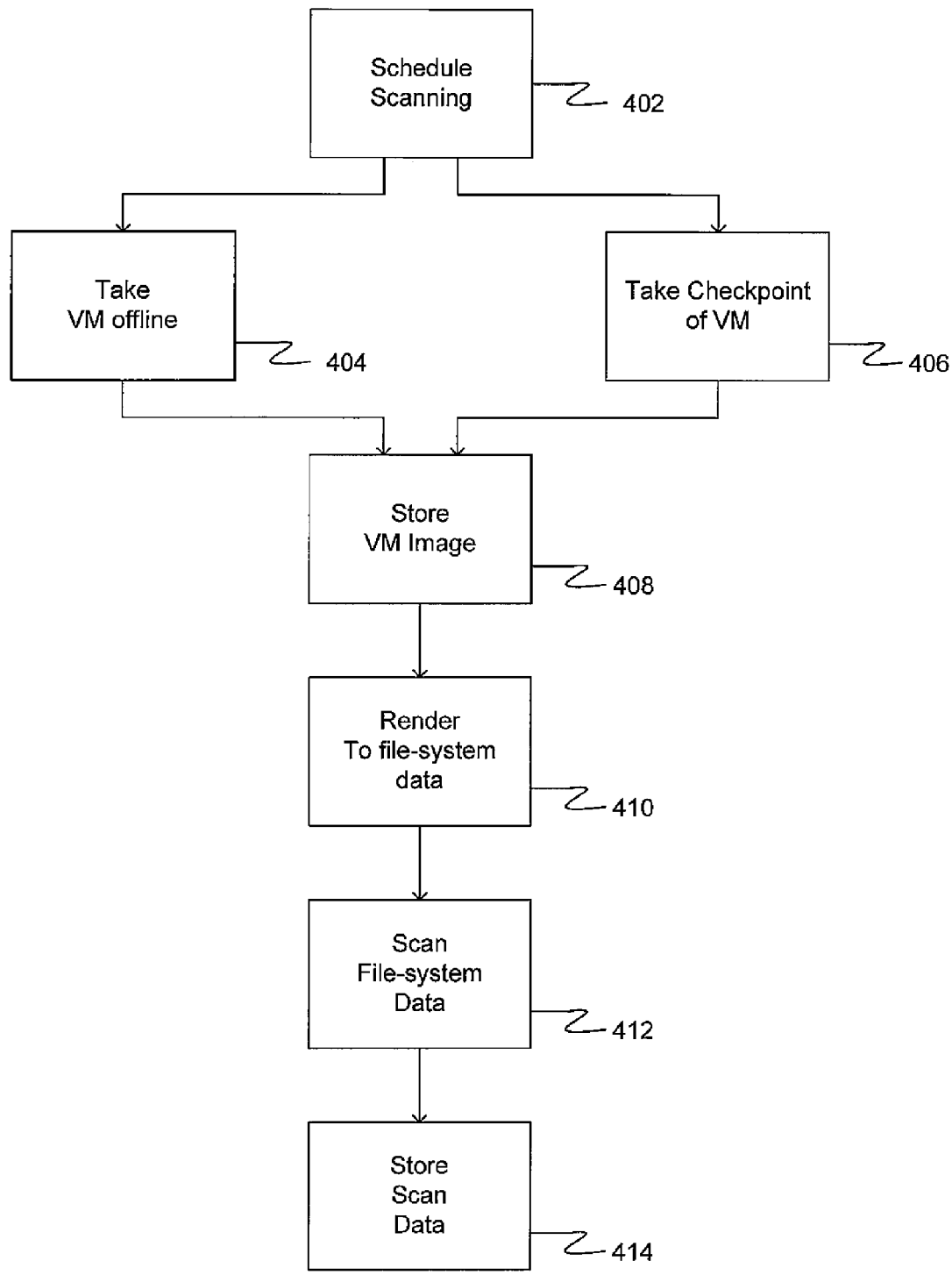
FIG. 4 depicts an illustrative process for scanning a virtual machine image.

FIG. 4 depicts an illustrative process for scanning a virtual machine image 304. At 402, a scan of a virtual machine image 304 may be scheduled. The scheduling may occur via a management application. In one embodiment, the management application may run locally on the host computer 300 on which the virtual machine 108 being scanned resides. In another embodiment, the management application may run remotely on a server operatively connected to the host computer 300.

The management application may be used to schedule an immediate scan, such as a scan on demand for example, or a scan at a future time. The management application may be used to select the time and date of the scan. In addition, the management application may schedule a periodic scanning, such as once a week for example. The management application may record historical data, data for generating reports, data relating to the scan, such as the host name and IP address of the host computer 300 on which the virtual machine 108 is located, the host name or other identifier of the virtual machine 108 to be scanned, and the nature of the scan. The nature of the scan may comprise information about the types, names, locations or other information relating to the files or data to be scanned. The scheduling of scanning may occur through a web based interface or other management interface.

At 404, a virtual machine 108 to be scanned may be taken off-line. A copy of the virtual machine image 304 may be made. In another embodiment, at 406 a checkpoint (or point-in-time copy) of the virtual machine 108 may be made while the virtual machine 108 is online. For example, the virtual machine monitor 106 may export a copy of the virtual machine image 304. The checkpoint may result in a virtual machine image 304 that may be stored. In one embodiment, the virtual machine image 304 may be stored as one or more virtual hard disk files 302. In another embodiment, the virtual hard disk files 302 may be accompanied by metadata 303. By periodically creating a checkpoint of a running virtual machine and scanning the checkpoint image, a virtual machine may be verified to be free of malware even without having an anti-malware agent running inside the virtual machine.

At 408 the virtual image may be stored. For example, the virtual machine image 304 may be stored on the host computer 300, on a remote server (see FIG. 5), a network data store, a storage area network, a database, and the like. Storing the virtual machine image 304 may comprise storing both the virtual hard disk file 302 and the metadata file 303. In one embodiment storing the virtual machine image 304 may comprise copying the virtual machine image 304 into a database, as well as, collecting other information about the virtual machine image 304 and storing it in the database as well. For example the other information may comprise a timestamp, date stamp, and/or the hostname from which the virtual machine image 304 was taken, the IP address or other identifier of the host computer 300 from which the virtual machine image 304 was taken, the virtual machine's function, and the like.

At 410, the virtual machine image 304 may be rendered to file-system data. Because the virtual machine image 304 may appear as a virtual hard disk file 302 outside of the context of the virtual machine 108 itself, the virtual machine image 304 may be rendered to information suitable for scanning. When the virtual machine image 304 is stored as a virtual hard disk file 302, the files may not be available for scanning, for example because of their binary compressed format. For example, the virtual machine image 304 may encapsulate the virtual machine's system files and registry hive. Rendering the stored virtual machine image 304 may comprise translating the virtual machine image 304 into a format such that the files and directories 305 readable inside the virtual machine 108 are now readable by a host operating system 104 or another computer's operating system, for example. The process of rendering may comprise mounting the VHD files 302 on the host operating system via a kernel mode driver (file system driver and the like). The mounter will expose the VHD file as it is exposed inside the VM, as a physical disk device. Then, letters may be assigned to the volumes of the disk and data exposed as if it were inside the guest operating system of the virtual machine image 304. Since no operating system is running on the exposed data, everything is seen as data and as being offline. Once rendered, objects such as the virtual machines system files, registry hive, and other aspects of the virtual machine image 304 may be available for scanning.

In one embodiment, rendering the virtual machine image 304 to file-system data comprises translating the virtual machine image 304 to data understandable by the host operating system's file system. For example, the file-system data may comprise a listing or representation of all the files contained within the virtual machine image 304. Rendering a virtual machine image 304 may comprise translating metadata information, from a metadata file 303 for example, and relating the metadata information to the contents of the virtual machine image 304. For example, the metadata information may describe and identify the VHDs and volumes comprising the virtual machine image 304 as system volumes or data volumes. This information may be desirable when scanning for boot sector viruses, scanning registry hives, and the like.

In one embodiment, rendering the virtual machine image 304 to file-system data may comprise mounting the virtual hard drive image as a physical disk device. When the virtual machine image 304 is mounted, on a host computer 300 or server computer (see FIG. 5), the virtual machine image 304 may appear under a drive letter as an available volume and file-system. The files within the virtual machine image 304 may be available for scanning under the now mounted VHD file as they are now part of the host operating system list of volumes. Mounting may be accomplished with a tool such as the VHD mounter, for example.

In another embodiment, rendering the virtual machine image 304 may comprise a kernel mode driver filter connected to an anti-malware engine. Such a filter may be used to render the virtual machine image 304 to file-system data available to the anti-malware engine without mounting the virtual hard drive image. With such a filter, the virtual machine image 304 may be rendered and scanned concurrently. With such a filter embedded in the VMM, a virtual machine can even be scanned while running without needing to render the virtual machine image.

At 412, collection of volumes that comprise the virtual machine image may be scanned for malware by an anti-malware engine. For example, anti-virus software and anti-spyware software may scan for malware on a computer generally. For example, scanning for malware may comprise searching the system files, boot and driver records, and registry hive for corresponding malware signatures. Scanning for malware may comprise heuristics scanning, for example. Scanning the registry hive might, for example, comprise loading the registry hive into memory and scanning the loaded data.

The anti-malware engine may be an anti-virus engine, an anti-spyware engine, an anti-spam engine, and the like. Scanning the file-system data may comprise a full scan in which every aspect or file of the file-system data is checked for malware. The scanning may comprise a partial scan in which only targeted files and aspects of the file-system data, such as system files, the registry hive and aspects of the file-system data related to booting, are scanned for malware. A huge advantage of scanning the file system and the registry hive and the OS of the virtual machine in an off-line way is that the malware does not have an opportunity to mask itself since it is not running. In a traditional scan for malware, the OS is booted up and the malware could be running, preventing the anti-malware engine from effectively scanning it because the malware has commandeered certain OS functions.

Responsive to the scan, malware may be detected and based on user recommendations the virtual machine image might be cleaned of malware or the virtual machine image 304 may be free of malware. At 414, data relating to the scanning may be stored. For example, an indication of the result of the scan may be stored. The anti-malware engine may give an indication to the user of the results of the scanning. For example, it may e-mail, text-message, provide visual or audio indication, and the like that malware has been detected or that malware has not been detected.

The anti-malware engine may store other data relating to the scan. For example, the anti-malware engine may store a log file describing each file scanned and the result of that scan. Data indicative of the time and date at which the virtual machine image 304 was scanned may be stored as well.

The anti-malware engine may record the identity of the virtual machine 108. For example, when the virtual machine image 304 is represented by a virtual hard disk file 302, the anti-malware engine may store the file name and location of the virtual hard disk file 302. Also for example, data that indicates to which virtual machine 108 the virtual machine image 304 corresponds and from which host the virtual machine image 304 was taken may be stored.

In one embodiment, the related data may be stored in a database, table, or the like. The data may be collected across many scans. For example, scans of multiple virtual machine images 304 may be stored. The anti-malware engine may run on the local host computer 300 or a remote server for example.

Figure 7:
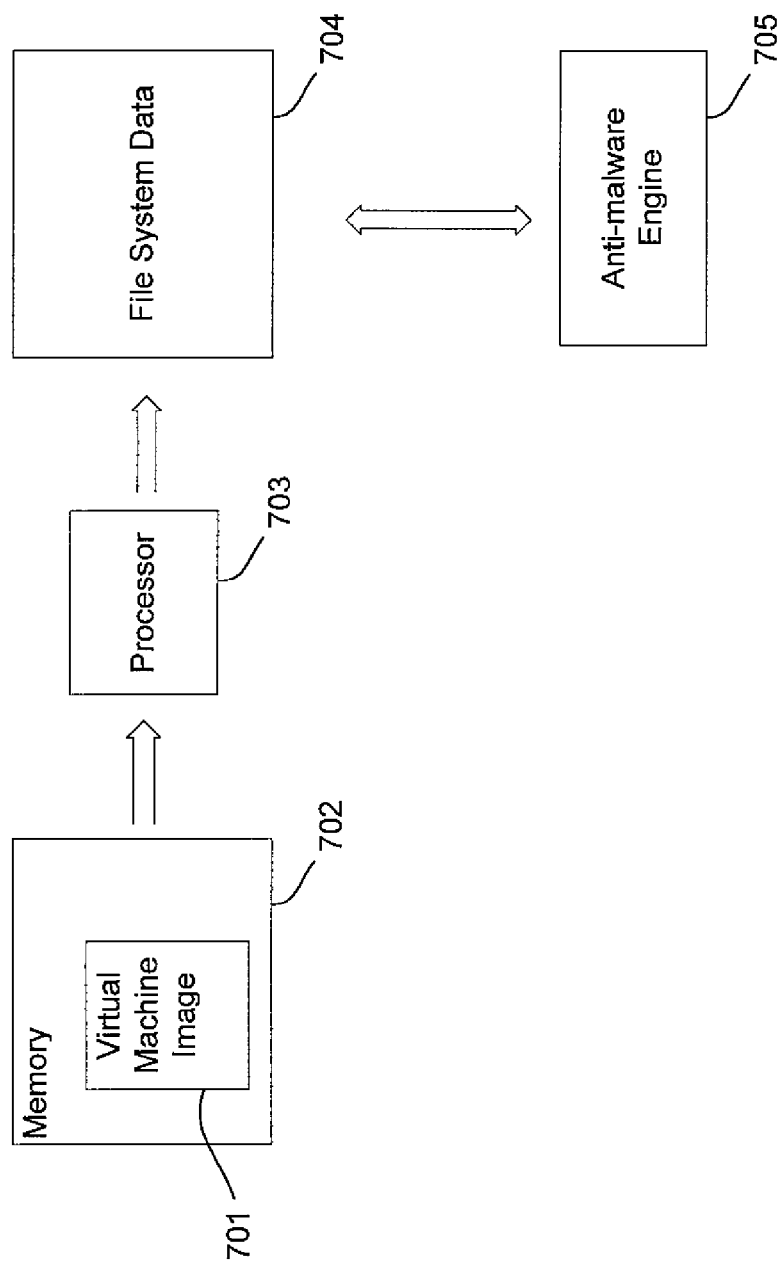
FIG. 7 is a block diagram of an example system embodying an illustrative process.

FIG. 7 depicts a simplified block diagram of a system that may embody the process described above. A virtual machine image 701 is stored in a memory unit 702. For example, the virtual machine image 701 may comprise one or more virtual hard disk files and associated metadata files and the memory unit 702 may be any sort of memory unit suitable for file storage. A processor 703 is configured to render the virtual machine image 701 to file-system data 704. In some embodiments the processor 703 may be a VHD mounter. The rendered file-system data 704 is in a format such that files and system information represented by the virtual machine image are accessible to, for example, a host operating system, another computer's operating system, or an anti-malware engine 705. An anti-malware engine 705 is configured to scan the file-system data 704 as described above in relation to FIG. 4.

Figure 5:
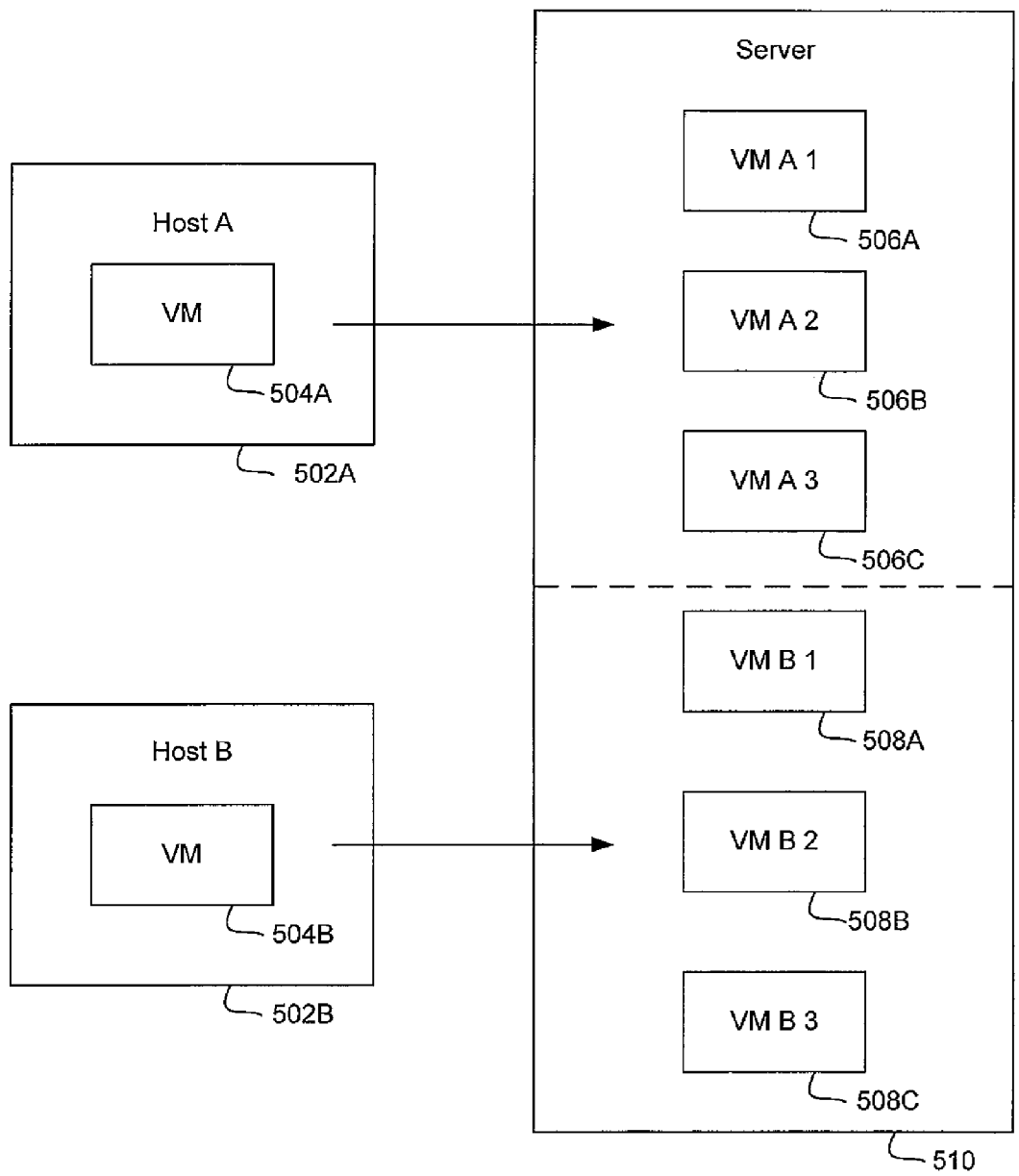
FIG. 5 depicts an example host/server architecture for virtual machine images.

FIG. 5 depicts an example host/server architecture for virtual machines. One or more hosts 502A, B may be associated with a server 510. Each host 502A, B may support one or more virtual machines 504A, B. A host 502A, B may be any computing device capable of supporting a virtual machine 504A, B. For example, the host 502A, B may be a personal computer, a handheld device, laptop computer, cell phone, and the like. Each host 502A, B may be identified by hostname for example.

The server may also be any computing device capable of processing and storing multiple virtual machine images 506A-C, 508A-C. The server may be in operative communication with each host 502A, B. The host 502A, B and server 510 may be programmed such that virtual machine images 506A-C, 508A-C may be stored in the server 510. The virtual machine images 506A-C, 508A-C may be stored from the hosts 502A, B, deployed to the hosts 502A, B, modified, copied, and the like.

In one embodiment, virtual machines images 506A-C, 508A-C of each host 502A, B may be stored periodically as a checkpoint. Such checkpoints may represent a snapshot of the state and data of the virtual machine 504A, B at the time of the checkpoint, for example a point-in-time copy of the virtual machine image. The virtual machine images 506A-C, 508A-C from each host 502A, B may be transferred to the server 510. The server 510 may be a library server, database, data store, storage area network, and the like. For example, the server 510 may store the virtual machine images 506A, B, 508A, B as well as data indicative of the source of the virtual machine image 506A-C, 508A-C and the time and date at which the virtual machine image 506A-C, 508A-C was taken.

As a result, the server 510 may contain a comprehensive view across all hosts 502A, B in network of virtual machines and their respective status at different points in time. Such a collection of data presents a particular advantage. The administrator may essentially go back in time to restore the network of hosts 502A, B and virtual machines 504A, B to a state at a previous point in time. By taking earlier virtual machine images 506A-C, 508A-C from the server 510 and reinstating them on the hosts 502A, B, the administrator may be able to restore a network of hosts 502A, B and virtual machines 504A, B following an infestation of malware.

Such an infestation may be computer virus, worm, hacker attack, and the like. In addition, the administrator may be able to determine forensic data about the infestation, such as the time of infestation and the source of the infestation for example. For example, if malware is detected in an existing VM, an anti-malware engine could be applied to checkpoints going back in time to identify when and where the malware was introduced, and to locate the most recent malware-free virtual machine image for restoration.

An administrator could have a numerous checkpoints for each VM. Some of these checkpoints may go more than a few weeks back in time. Those checkpoints may not have updated virus definitions or have not been scanned for malware for a quite some time. If an administrator chooses to revert to such a checkpoint, the checkpoint image can be scanned offline prior to the reversion, ensuring that no older copy of a VM that has not been scanned is allowed to be run.

Figure 6:
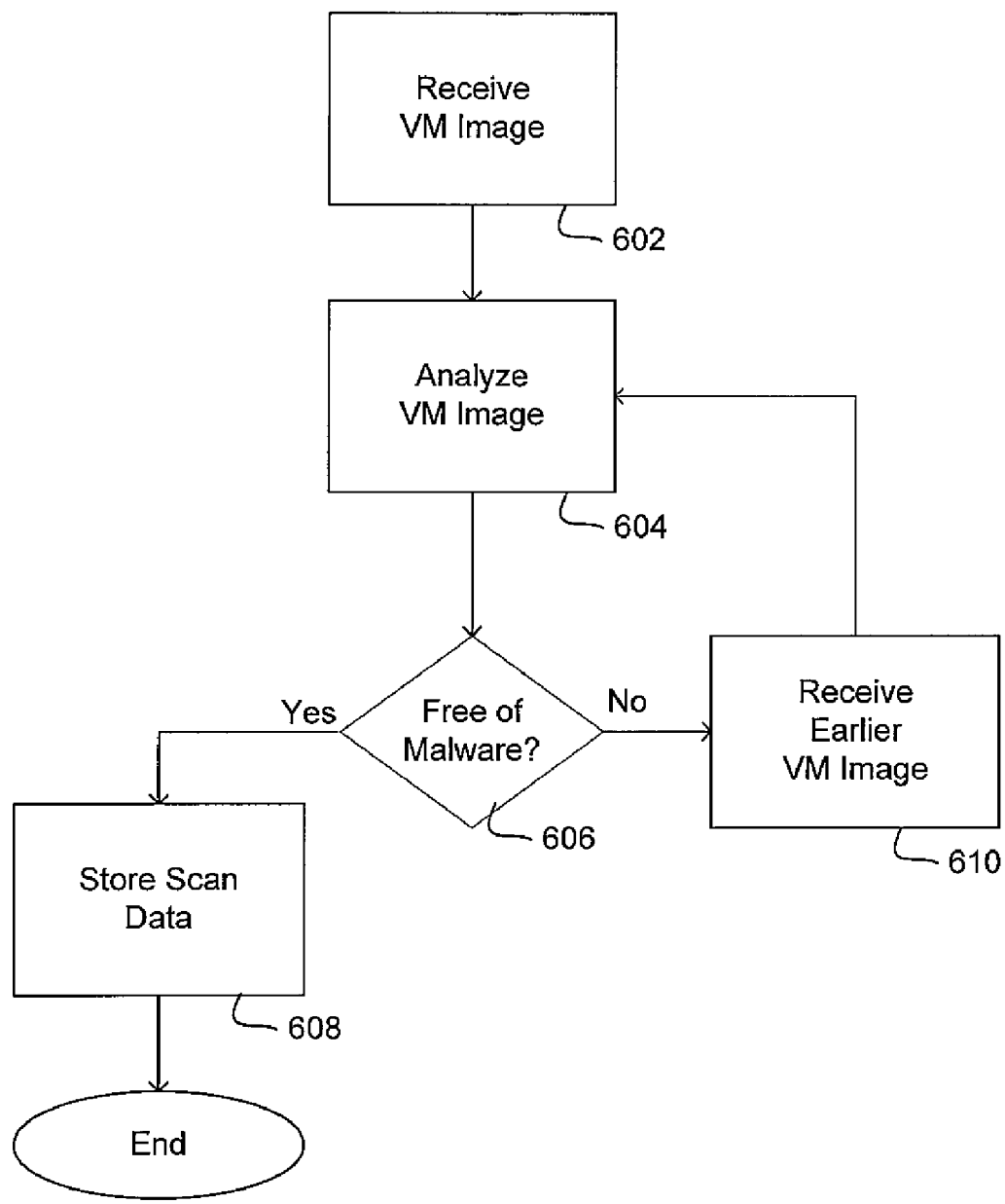
FIG. 6 depicts an illustrative process for scanning a plurality of virtual machine images.

FIG. 6 depicts an illustrative process for scanning a plurality of virtual machine images 506A-C, 508A-C. At 602, the server 510 may receive a virtual machine image 506A-C, 508A-C. The server 510 may collect a plurality of virtual machine checkpoint images 506A-C, 508A-C, each associated with the same virtual machine 504A, B and each taken at different points in time. The server 510 may store a set of virtual images 506A-C, 508A-C and the point in time each one represents.

At 604, a first virtual machine image 304 may be analyzed. In one embodiment, the most recently captured virtual machine image 506A-C, 508A-C of the set of virtual machine images may be analyzed. Analyzing the virtual machine image 304 may comprise both rendering the virtual machine image 506A-C, 508A-C to file-system data and scanning the file-system data with the anti-malware engine.

Upon analyzing the virtual machine image 506A-C, 508A-C, at 606, the anti-malware engine may indicate that the virtual machine image 506A-C, 508A-C is infested with malware or that the virtual machine image 506A-C, 508A-C is not infested with malware. If the virtual machine image 506A-C, 508A-C is not infested, the server 510 may store scan data, at 608. On the other hand, if the virtual machine image 506A-C, 508A-C is infested, the server 510 may receive a second virtual machine image 506A-C, 508A-C, at 610. The second virtual machine image 506A-C, 508A-C may be the next most recently captured virtual machine image 506A-C, 508A-C. The second virtual machine image 506A-C, 508A-C may be analyzed similar to first virtual machine image 304.

The server 510 may be able to iteratively scan timestamped virtual machine checkpoint images 506A-C, 508A-C, stepping back in time until a virtual machine image 506A-C, 508A-C without malware is found. Once the virtual machine image 506A-C, 508A-C is found without a malware infestation, the virtual machine image 506A-C, 508A-C may be used to restore an infested virtual machine 504A, B.

While the present disclosure has been described in connection with various embodiments, illustrated in the various figures, it is understood that similar aspects may be used or modifications and additions may be made to the described aspects of the disclosed embodiments for performing the same function of the present disclosure without deviating therefrom. Therefore, the present disclosure should not be limited to any single aspect, but rather construed in breadth and scope in accordance with the appended claims.

What is claimed:

1. A method for scanning a virtual machine image associated with a most recent non-infected checkpoint of a virtual machine, the method comprising:
    scanning a set of checkpoints of the virtual machine to identify the most recent non-infected checkpoint, the scanning of the set beginning with a most recently captured checkpoint and then repeatedly progressing to a next most recently captured checkpoint until the most recent non-infected checkpoint is identified;
    rendering the virtual machine image associated with the most recent non-infected checkpoint to file-system data by translating the virtual machine image into a format understandable to a file system, the translating comprising translating a .cfg or .vmc metadata file into a format understandable to the file system and relating metadata information in the metadata file to contents of the virtual machine image, the metadata information identifying the contents of the virtual machine image as system volumes or data volumes; and
    scanning the file-system data with an anti-malware engine based on the metadata information.

2. A method as recited in claim 1, wherein the file-system data corresponds to a file system of the virtual machine.

3. A method as recited in claim 1, further comprising:
    taking the virtual machine off-line; and
    storing an image of the virtual machine.

4. A method as recited in claim 1, further comprising:
    taking a checkpoint of the virtual machine while the virtual machine is on-line.

5. A method as recited in claim 1, wherein the rendering the virtual machine image to file-system data comprises rendering the virtual machine image to file-system data for use by the anti-malware engine.

6. A method as recited in claim 1, wherein the data indicative of the scanning comprises at least one of a scanning timestamp, a scanning result, and a list of infected components within the file-system data.

7. A method as recited in claim 1, further comprising scheduling a time and date for the rendering and scanning of the file system data.

8. A method as recited in claim 1, wherein the virtual machine image comprises a virtual hard disk file.

9. A method as recited in claim 8, wherein the rendering the virtual machine image to file-system data comprises mounting the virtual hard disk file as a physical hard drive.

10. A computer readable storage medium excluding transmission media and carrier waves comprising computer executable instructions, the instructions comprising instructions for:
    scanning a set of checkpoints of a virtual machine to identify a most recent non-infected checkpoint, the scanning of the set beginning with a most recently captured checkpoint and then repeatedly progressing to a next most recently captured checkpoint until the most recent non-infected checkpoint is identified;
    rendering the virtual machine image associated with the most recent non-infected checkpoint to file-system data by translating the virtual machine image into a format understandable to a file system, the translating comprising translating a .cfg or .vmc metadata file into a format understandable to the file system and relating metadata information in the metadata file to contents of the virtual machine image, the metadata information characterizing the contents of the virtual machine image as system volumes or data volumes; and
    invoking an anti-malware engine to scan the file-system data based on the metadata information.

11. A computer readable storage medium as recited in claim 10, wherein the instructions further comprise instructions for:
    receiving a first virtual machine image associated with the virtual machine at a first time;
    receiving a second virtual machine image associated with the virtual machine at a second time, wherein the first time is earlier than the second time;
    analyzing the second virtual machine image, wherein the analyzing comprises rendering the second virtual machine image to file-system data and invoking an anti-malware engine to scan the file-system data; and
    responsive to analyzing the second virtual machine image, analyzing the first virtual machine image.

12. A computer readable storage medium as recited in claim 11, wherein the instructions for receiving a first virtual machine image comprise instructions for receiving at a server a checkpoint image from an on-line virtual machine on a host computer.

13. A computer readable storage medium as recited in claim 11, wherein the instructions for receiving a first virtual machine image comprise instructions for retrieving the first virtual image from a library of virtual machine images.

14. A computer readable storage medium as recited in claim 11, further comprising instructions for:
   receiving scheduling data at a server,
   initiating the rendering according to the received scheduling data; and
   invoking the anti-malware agent to scan the file-system data according to the received scheduling data.

15. A computer readable storage medium as recited in claim 10, wherein the instructions further comprise instructions for:
   generating a signal indicative of the identified most recent non-infected checkpoint.

16. A system for scanning a virtual machine image associated with a most recent non-infected checkpoint of a virtual machine, the method comprising:
   a processor;
   memory having stored therein instructions comprising instructions for:
      scanning a set of checkpoints of the virtual machine to identify the most recent non-infected checkpoint, the scanning of the set beginning with a most recently captured checkpoint and then repeatedly progressing to a next most recently captured checkpoint until the most recent non-infected checkpoint is identified;
      rendering the virtual machine image associated with the most recent non-infected checkpoint to file-system data by translating the virtual machine image into a format understandable to a file system, the translating comprising translating a .cfg or .vmc metadata file into a format understandable to the file system and relating metadata information in the metadata file to contents of the virtual machine image, the metadata information describing the contents of the virtual machine image as system volumes or data volumes; and
      scanning the file-system data with an anti-malware engine based on the metadata information.

17. A system as recited in claim 16, wherein the virtual machine image is a result of taking a checkpoint of an on-line virtual machine.

18. A system as recited in claim 16, wherein the virtual machine image comprises a virtual hard disk file.

19. A system as recited in claim 18, further comprising a mounter configured to mount the virtual hard disk file as a physical hard drive.

* * * * *